（12) United States Patent
Gorsuch et al.

(10) Patent No.: US 10,073,443 B2
(45) Date of Patent: Sep. 11, 2018

(54) METHOD AND APPARATUS FOR CONTROLLING THE SPEED OF A CONTINUOUS SHEET OF MATERIAL

(71) Applicant: Ball Corporation, Broomfield, CO (US)

(72) Inventors: Jason E. Gorsuch, Golden, CO (US); Kenneth D. Anderson, Bristol, VA (US); Alex V. Crisman, Arvada, CO (US); Thomas J. Stokes, Arvada, CO (US)

(73) Assignee: BALL CORPORATION, Broomfield, CO (US)

( * ) Notice: Subject to any disclaimer, the term of this patent is extended or adjusted under 35 U.S.C. 154(b) by 306 days.

(21) Appl. No.: 15/130,319

(22) Filed: Apr. 15, 2016

(65) Prior Publication Data

US 2016/0306347 A1    Oct. 20, 2016

Related U.S. Application Data

(60) Provisional application No. 62/149,079, filed on Apr. 17, 2015.

(51) Int. Cl.
*B21D 51/44* (2006.01)
*G05B 19/418* (2006.01)
(Continued)

(52) U.S. Cl.
CPC ....... *G05B 19/41865* (2013.01); *B21D 43/05* (2013.01); *B21D 51/446* (2013.01);
(Continued)

(58) Field of Classification Search
None
See application file for complete search history.

(56) References Cited

U.S. PATENT DOCUMENTS 3,086,889 A    4/1963  Strong
3,230,925 A    1/1966  Blanz
(Continued)

FOREIGN PATENT DOCUMENTS

EP    1590108     6/2011
GB    2428659    11/2007
(Continued)

OTHER PUBLICATIONS

"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].
(Continued)

*Primary Examiner* — Isaac T Tecklu
(74) *Attorney, Agent, or Firm* — Sheridan Ross PC

(57) ABSTRACT

A system and method of controlling the input and output speed of a continuous sheet of stock material is provided. More specifically, the present invention relates to a system and method used to perform an operation on a continuous sheet of stock material in a high speed manufacturing system. The continuous sheet of stock material may subsequently be received by a second system that performs a different operation on the stock material. In one embodiment, the second system forms the stock material into tabs for container end closures. The system includes an infeed accumulation device and an outfeed accumulation device. The infeed and outfeed accumulation devices enable the system to operate at a variable rate and out of phase with a high speed, coil fed manufacturing system to which the system may be removably integrated.

21 Claims, 7 Drawing Sheets

(51) Int. Cl.
*B21D 43/05* (2006.01)
*B65H 20/00* (2006.01)

(52) U.S. Cl.
CPC ... *B65H 20/00* (2013.01); *G05B 2219/31376* (2013.01); *G05B 2219/37129* (2013.01)

(56) References Cited

U.S. PATENT DOCUMENTS

| | | | |
|---|---|---|---|
| 3,286,302 A | 11/1966 | Doering | |
| 3,818,335 A | 6/1974 | Stungis et al. | |
| 4,024,545 A | 5/1977 | Dowling et al. | |
| 4,203,240 A * | 5/1980 | Goodwin | A63F 3/065 |
| | | | 283/56 |
| 4,304,981 A | 12/1981 | Gappa | |
| 4,393,411 A | 7/1983 | Amtower | |
| 4,467,207 A | 8/1984 | Lerner et al. | |
| 4,485,935 A | 12/1984 | Stoffel | |
| 4,635,545 A | 1/1987 | Kubacki et al. | |
| 4,922,077 A | 5/1990 | Gordon | |
| 4,965,829 A | 10/1990 | Lemelson | |
| 5,125,780 A | 6/1992 | Budenbender | |
| 5,170,279 A | 12/1992 | Schwartz et al. | |
| 5,202,199 A | 4/1993 | Mitzutani et al. | |
| 5,215,864 A | 6/1993 | Laakmann | |
| 5,235,454 A | 8/1993 | Iwasaki | |
| 5,315,108 A | 5/1994 | Gross | |
| 5,331,443 A | 7/1994 | Stanisci | |
| RE34,837 E | 1/1995 | Iwanami et al. | |
| 5,401,979 A | 3/1995 | Kooijman et al. | |
| 5,555,992 A | 9/1996 | Sedgeley | |
| 5,653,900 A | 8/1997 | Clement et al. | |
| 5,719,372 A | 2/1998 | Togari et al. | |
| 5,751,436 A | 5/1998 | Kwon et al. | |
| 5,837,962 A | 11/1998 | Overbeck | |
| 5,864,788 A * | 1/1999 | Kutsumi | G06F 17/271 |
| | | | 704/2 |
| 6,021,266 A * | 2/2000 | Kay | G06F 17/5045 |
| | | | 716/103 |
| 6,062,556 A * | 5/2000 | McCay | B65H 39/06 |
| | | | 271/225 |
| 6,080,958 A | 6/2000 | Miller et al. | |
| 6,105,806 A | 8/2000 | Stasiuk | |
| 6,314,562 B1 * | 11/2001 | Biggerstaff | G06F 9/451 |
| | | | 717/156 |
| 6,433,302 B1 | 8/2002 | Miller et al. | |
| 6,460,723 B2 | 10/2002 | Nguyen et al. | |
| 6,498,318 B1 | 12/2002 | Miller et al. | |
| 6,533,518 B1 | 3/2003 | Turner et al. | |
| 6,706,995 B2 * | 3/2004 | Miller | B21D 51/383 |
| | | | 219/121.68 |
| 6,745,384 B1 * | 6/2004 | Biggerstaff | G06F 8/4441 |
| | | | 712/203 |
| 6,808,351 B1 | 10/2004 | Brown et al. | |
| 7,638,252 B2 | 12/2009 | Stasiak et al. | |
| 7,972,426 B2 | 7/2011 | Hinch et al. | |
| 8,146,768 B2 | 4/2012 | Forrest et al. | |
| 8,844,747 B2 | 9/2014 | Petti | |
| 9,007,413 B2 | 4/2015 | Boisvert et al. | |
| 9,186,924 B2 | 11/2015 | Lewis | |
| 9,278,776 B2 * | 3/2016 | Ramsey | B41M 5/28 |
| 2003/0015507 A1 * | 1/2003 | Miller | B21D 51/383 |
| | | | 219/121.68 |
| 2005/0045637 A1 | 3/2005 | Rohr et al. | |
| 2006/0117980 A1 * | 6/2006 | Cesak | E04D 1/26 |
| | | | 101/494 |
| 2008/0011772 A1 * | 1/2008 | Morris | A47K 10/36 |
| | | | 221/258 |
| 2009/0008859 A1 | 1/2009 | Fairweather et al. | |
| 2009/0179375 A1 * | 7/2009 | Tamura | B65H 29/041 |
| | | | 271/198 |
| 2010/0088665 A1 * | 4/2010 | Langworthy | G06F 8/43 |
| | | | 717/104 |
| 2010/0131936 A1 * | 5/2010 | Cheriton | G06F 9/4496 |
| | | | 717/146 |
| 2011/0084051 A1 | 4/2011 | Reed et al. | |
| 2011/0115815 A1 | 5/2011 | Xu et al. | |
| 2013/0075401 A1 | 3/2013 | Forrest | |
| 2013/0224379 A1 * | 8/2013 | Kitamura | B01D 67/0013 |
| | | | 427/245 |
| 2014/0042132 A1 | 2/2014 | Boisvert et al. | |
| 2014/0084003 A1 | 3/2014 | Ramsey et al. | |
| 2014/0271043 A1 | 9/2014 | Butcher et al. | |
| 2014/0271044 A1 | 9/2014 | Butcher et al. | |
| 2014/0291322 A1 | 10/2014 | Ramsey et al. | |
| 2015/0020205 A1 * | 1/2015 | Wang | H04L 63/1466 |
| | | | 726/25 |
| 2015/0027327 A1 * | 1/2015 | Ellefson | B41F 17/28 |
| | | | 101/41 |
| 2015/0158627 A1 * | 6/2015 | Ramsey | B65D 17/165 |
| | | | 220/270 |
| 2015/0174638 A1 * | 6/2015 | Anguera | B44B 5/0004 |
| | | | 220/674 |
| 2015/0209854 A1 * | 7/2015 | Selepack | B21C 47/247 |
| | | | 29/428 |
| 2015/0375943 A1 * | 12/2015 | Ellefson | B21D 43/003 |
| | | | 101/40.1 |
| 2016/0016687 A1 | 1/2016 | Ramsey et al. | |
| 2016/0034805 A1 * | 2/2016 | Ramsey | B23K 26/0087 |
| | | | 206/459.5 |
| 2016/0046033 A1 * | 2/2016 | Zuech | B26D 5/007 |
| | | | 700/127 |
| 2016/0114501 A1 * | 4/2016 | Carson | B29C 31/008 |
| | | | 225/2 |
| 2016/0221065 A1 | 8/2016 | Butcher et al. | |
| 2016/0332772 A1 * | 11/2016 | Ramsey | B65D 17/4012 |
| 2016/0350090 A1 * | 12/2016 | Kawaguchi | G06F 8/4441 |

FOREIGN PATENT DOCUMENTS

| | | |
|---|---|---|
| GB | 2428668 | 7/2008 |
| JP | S63-252746 | 10/1988 |
| JP | H08-175006 | 7/1996 |
| JP | 2011-006093 | 1/2011 |
| JP | 2011-011760 | 1/2011 |
| JP | 2011-016545 | 1/2011 |
| JP | 2011-20701 | 2/2011 |
| WO | WO 01/68460 | 9/2001 |
| WO | WO 2007/007102 | 1/2007 |
| WO | WO 2011/053776 | 5/2011 |
| WO | WO 2013/049313 | 4/2013 |
| WO | WO 2013/049320 | 4/2013 |
| WO | WO 2013/155423 | 10/2013 |
| WO | WO 2013/158771 | 10/2013 |
| WO | WO 2014/028360 | 2/2014 |
| WO | WO 2014/072455 | 5/2014 |
| WO | WO 2014/150647 | 9/2014 |
| WO | WO 2014/152858 | 9/2014 |

OTHER PUBLICATIONS

"Videojet® Allprint LN100A ND: YAG Laser Marking System," Videojet Technologies Inc., © 2010, 2 pages.
International Search Report and Written Opinion for International (PCT) Patent Application No. PCT/US2016/027805, dated Aug. 25, 2016 14 pages.
Official Action for Australia Patent Application No. 2016249245, dated May 2, 2018 3 pages.
Official Action for Canada Patent Application No. 2,982,977, dated Jun. 18, 2018 4 pages.

* cited by examiner

METHOD AND APPARATUS FOR CONTROLLING THE SPEED OF A CONTINUOUS SHEET OF MATERIAL

CROSS-REFERENCE TO RELATED APPLICATIONS

This application claims priority under 35 U.S.C. § 119(e) to U.S. Provisional Patent Application Ser. No. 62/149,079 filed Apr. 17, 2015, which is incorporated herein in its entirety by reference.

FIELD OF THE INVENTION

The present invention relates generally to the manufacture of container end closures. More specifically, the present invention relates to a system and method of controlling the speed of a continuous sheet of material, and more specifically, of tab stock. The system can operate out of phase with a high speed, coil fed end closure manufacturing system to which the tab manufacturing and marking system is removably integrated.

BACKGROUND

As part of container manufacturing, or in some cases during filling or sealing operations of containers, markings may be placed on a number of container locations including the end closure. The markings may serve a variety of purposes, including decorating the container, identifying contents, identifying the location or date of manufacture or use, identifying the maker of the container or container component, the style or materials for the container, providing trade names, advertising, promotion, or the like. In some situations, promotional information such as sweepstakes, contests, or some other indicia are placed or marked on containers or container components.

A variety of devices and procedures have been used for marking containers and container components, such as pull tabs. Currently the container body is the primary surface of a container that is marked. However, container bodies and the markings thereon are frequently obstructed during use of the container, such as by the consumer's hand during consumption of a beverage from a beverage container. Metal tabs used to open containers provide a unique and effective surface for marking with advertising and other indicia in new and creative ways. Unlike the container body, consumers naturally look at the tab to open the container. Further, the tab is typically not obstructed or blocked during consumption of a beverage from a beverage container.

Pull tabs, or "tabs" as discussed herein, are formed separately from the container body during an end closure manufacturing process. The manufacture of container end closures requires a number of processing steps collectively referred to as a conversion process. A typical conversion process is generally illustrated and described in "How Ball Makes Beverage Ends," available at http://www.ball.com/images/ball_com/product_options_files/How_Ball_Makes_Beverage_Ends.pdf (last visited Mar. 16, 2015) and U.S. Pat. No. 6,533,518, which are incorporated herein by reference in their entirety. During the conversion process, an uncoiler feeds a continuous sheet of metal tab stock into a conversion press. The conversion press forms the sheet of metal into tabs and interconnects the tabs to the end closure with a rivet. Various methods of marking container tabs and other components of beverage containers are described in U.S. Pat. No. 6,105,806, U.S. Pat. No. 7,972,426, U.S. Pat. No. 7,638,252, U.S. Pat. No. 8,146,768, U.S. Patent Application No. 2005/0045637, U.S. Patent Application No. 2013/0075401, U.S. Patent Application No. 2013/0270269, and PCT International Publication No. WO 2013/049320 which are incorporated herein by reference in their entirety.

In some cases, embossing or incising processes have been used to mark containers and tabs. Embossing or incising, via stamping, can require an undesirably large inventory of tools for different kinds of lettering or symbols forming the marks. Further, embossing or incising processes typically require the need to shut down an assembly line or conversion press to disassemble the conversion press whenever it is necessary to replace tools for maintenance or repairs or to change the mark being incised or embossed. Such shutdowns are particularly troublesome when it is desirable to change the marks with relatively high frequency, such as when markings on containers or tabs are intended to be used as part of a contest or sweepstakes in which there are preferably a relatively large number of different possible markings or indicia. Furthermore, it is difficult to accurately control the depth of embossing or incising and, in some cases, embossing or incising that is too deep may lead to leakage or container/end closure failure.

Another process which has been used for placing markings on containers and tabs has been one or more printing processes. Contact or press printing is sometimes useful for decorating or placing markings on containers where it is desired to place a relatively large number of identical markings on containers. However, contact printing is believed impractical for many components, such as tabs, because of the shape or position of the tab. Contact printing is also inefficient when it is desired to change the marks with relatively high frequency because of the need to stop a production line and at least partially disassemble the contact print device in order to change the configuration of the markings being printed on the tabs.

In some situations, components of containers, including tabs, may be marked using a non-contact printing process such as an inkjet process. Although inkjet equipment can be controlled to provide changes in markings, inkjet processes and equipment have been found to be relatively unreliable and to require frequent maintenance and repair. Inkjet processes have also been found to be subject to unwanted placement or positioning of ink. For example, inkjet printing can result in a mist of ink which can interfere with the printing process, cause undesired markings on containers, or cause equipment malfunction. In some cases, the use of an inkjet process can result in the loss of up to 20% or more of potential production time due to the need for clean up, maintenance, and/or repair. It has also been found difficult to achieve reliable adhesion of the ink to containers or container components. Additionally, inkjet processes have been difficult to provide at high speed without slowing the conversion press and while maintaining print quality to mark letters or other indicia without distortion. Finally, inkjet printing and direct contact printing processes provide only surface markings without forming indentations or otherwise altering the containers or container components. Accordingly, inkjet and other printing processes are generally inappropriate for use in connection with contest sweepstakes or to provide other valuable tokens or indicia as there is an undesirably large potential for counterfeiting or altering of the markings in an attempt to claim a contest or sweepstakes prize.

Some or all of the above difficulties in previous container marking systems and methods are particularly troublesome for metallic containers or container components such as typical aluminum alloy beverage containers and tabs. As compared with plastic or other container materials, metallic containers can be relatively difficult to mark, at least because it can be difficult to adhere ink to metal surfaces, because of the harder surfaces of metallic containers, and because of the higher melting or softening point of the metal material of the metallic containers. Further, marking systems must be capable of operating quickly to ensure downstream production equipment, such as the conversion press, can operate at a rated speed of approximately 750 cycles (or strokes) per minute. Accordingly, devices and processes used in connection with some container materials are not necessarily applicable to others. Further, in most situations, the functions or purposes of markings placed on metallic containers will rarely justify use of different methods and apparatus which would involve expenses that are substantially in excess of those involved with current methods and apparatus or that require operating the production line at a slower speed.

One known system of decorating tabs is described in U.S. Pat. No. 6,498,318 which is incorporated herein by reference in its entirety. The system described in U.S. Pat. No. 6,498,318 solves the problems described above by using laser light to mark the sheet of metal tab stock used to form a tab. The system marks the tab stock before the conversion press forms the tab stock into tabs and interconnects the tabs to the end closures. However, the system is directly integrated to the conversion press and cannot operate out of phase with the conversion press. Because the system cannot run independently of the feed rate of the conversion press, the available laser print times are limited and cannot be increased without reducing the speed of the conversion press.

Another method of decorating tabs involves coating the tabs or tab stock with a lacquer including a color agent or a lacquer having photonically active material. A laser then removes predetermined portions of the lacquers (or alters the appearance of the lacquers) to form an image. These methods of marking tabs are generally considered to be unsuitable as the lacquers added to the tab unacceptably increase the productions costs of tabs substantially in excess of those involved with current processes.

Some other methods describe the use of more powerful lasers to form a desired mark on the tab. For example, one method describes the use of a 200 Watt or a 600 Watt laser. However, the energy required to power lasers of these strengths makes their use uneconomical in an end closure manufacturing process where several hundred thousand or millions of tabs are manufactured daily. For example, in one known end closure manufacturing facility up to 5 million tabs are manufactured daily.

Accordingly, there is an unmet need for systems and methods of marking containers and tabs that can be removably integrated with a container end closure production line and that can operate out of phase with the container end closure production line without decreasing the efficiency, or increasing the costs, of current container end closure manufacturing processes.

SUMMARY OF THE INVENTION

The present invention provides systems and methods for forming and/or marking continuous sheets of material (including tab stock that is subsequently formed into tabs) in a cost-effective, fast, and reliable manner. The marked tab stock is subsequently formed into pull tabs that may be interconnected to a container end closure by a conversion press.

One aspect of the present invention is to provide a system and method that increases the time available to perform an operation on a continuous sheet of material without reducing the cycle rate of other equipment in a coil fed production process. The system includes a servo feed unit that can move the continuous sheet of material into a zone where the operation is performed at a rate faster than the other equipment in the coil fed production process. Thus, more time is provided to perform the operation without slowing the other equipment in the production process. In one embodiment, the operation comprises forming a mark on the continuous sheet of material. Optionally, a laser may be used to form the mark on the continuous sheet. Accordingly, by increasing the time available for the laser to form the mark, more complex graphics may be formed. Alternatively, by increasing the time available, the laser can form the mark at a lower power setting, thereby reducing operating costs. In another embodiment, the operation comprises one or more of a cutting, a punching, a shaping, and/or a forming step on a predetermined portion of the continuous sheet of material. In one embodiment, the continuous sheet of material is aluminum tab stock.

Another aspect of the invention is performing any type of operation on a continuous sheet of material where the speed of the continuous sheet of material needs to be controlled while the operation is being performed. In one embodiment, the operation may include, but is not limited to, cutting, punching, shaping, or forming the material or marking the material with an indicia. For example, the operation may comprise cutting a blank from the continuous sheet. The blank may subsequently be formed into an end closure or a metallic cup for a container body. Alternatively, the operation may include forming a score or an aperture in the continuous sheet of material. The operation may alternatively comprise marking the material with indicia. The material may comprise, but is not limited to, metal, plastic, or paper.

Another aspect of the present invention is to provide a marking system that can quickly and efficiently be removably integrated into a coil fed production process. In one embodiment, the coil fed production process is a container end closure manufacturing process.

Another aspect of the present invention is to provide improved, economical, and reliable systems and methods for applying marks to predetermined locations of a continuous sheet of stock material at high speed without slowing downstream production equipment. In one embodiment, the stock material is aluminum tab stock. The downstream production equipment includes a container end closure conversion press. In another embodiment, the stock material is aluminum end closure stock and the downstream production equipment includes a shell press and a conversion press.

Yet another aspect of the present invention is to provide a system and method of marking material that can operate out of phase compared to upstream and/or downstream production equipment. The system includes an infeed accumulation device for the material before the material is marked. The system also includes an outfeed accumulation device for the material after it is marked. The system is operable to monitor and determine the amount of material in the infeed and outfeed accumulation devices and adjust the cycle rate of at least one of the system, the upstream equipment, and the downstream equipment. In one embodiment, the upstream equipment comprises a tab stock uncoiler that supplies tab stock to the infeed accumulation device. The downstream production equipment comprises a container end closure conversion press that draws in the marked material from the outfeed accumulation device. In another embodiment, the upstream equipment comprises an uncoiler for aluminum end closure stock and a pinch roll stand. The pinch roll stand supplies the end closure stock to the infeed accumulation device. The downstream production equipment comprises a shell press that draws in the marked material from the outfeed accumulation device.

It is another aspect of the present invention to provide an apparatus for controlling the input and output speed of a continuous sheet of tab stock while providing indicia in a predetermined location. The apparatus includes, but is not limited to: (1) an infeed accumulation device to receive the continuous sheet of tab stock; (2) an infeed loop sensor to determine an amount of the continuous sheet of tab stock in the infeed accumulation device; (3) a servo feed unit to move a predetermined length of the continuous sheet of tab stock into a marking area at a predetermined rate; (4) a marking apparatus to form an indicia on a surface of the continuous sheet of tab stock; (5) an outfeed accumulation device to receive the continuous sheet of tab stock after the marking apparatus forms the indicia on the continuous sheet of tab stock; and (6) an outfeed loop sensor to determine an amount of the continuous sheet of tab stock in the outfeed accumulation device. The continuous sheet of tab stock may subsequently be formed into tabs adapted for interconnection to a container end closure.

In one embodiment, the marking apparatus is a laser unit adapted to form the indicia on one or more surfaces of the continuous sheet of tab stock. The laser unit is operable to form the indicia in less than approximately 60 milliseconds. The indicia may be any combination of letters, numbers, symbols, and images arranged in any order or orientation and of any size. In another embodiment, the servo feed unit is operable to move the predetermined length of the continuous sheet of tab stock into the marking area in less than approximately 35 milliseconds. In yet another embodiment, the servo feed unit is operable to alter the length of the continuous sheet of tab stock moved into the marking area to adjust a location of the indicia formed on the continuous sheet of tab stock by the marking apparatus. In another embodiment of the present invention, the apparatus can operate at up to, or greater than, approximately 800 cycles per minute.

In one embodiment, the predetermined rate of the servo feed unit can be altered to adjust the length of the continuous sheet of tab stock in one or more of the infeed and outfeed accumulation devices. In another embodiment, a time for the marking apparatus to form the indicia can be altered to adjust the length of the continuous sheet of tab stock in one or more of the infeed and outfeed accumulation devices.

In one embodiment, the infeed loop sensor measures a distance to a predetermined portion of the continuous sheet of tab stock in the infeed accumulation device. The predetermined portion of the continuous sheet of tab stock may optionally comprise one or more of: a lowermost portion of the continuous sheet of tab stock, and a transition point between a generally linear portion of the continuous sheet of tab stock and a trough of the continuous sheet of tab stock. Additionally or alternatively, the infeed loop sensor may comprise a first sensor in a first portion of the infeed accumulation device and a second sensor in a second portion of the infeed accumulation device. In one embodiment, the first sensor is aligned with a position of an insufficient amount of the continuous sheet of tab stock and the second sensor is aligned with a position of an excessive amount of the continuous sheet of tab stock. Accordingly, when a predetermined portion of the continuous sheet of tab stock within the infeed accumulation device is between the first sensor and the second sensor, a sufficient amount of tab stock is within the infeed accumulation device. In another embodiment, the first sensor is configured to determine when an insufficient amount of the continuous sheet of tab stock is in the infeed accumulation device. Continuing this example, the second sensor is configured to determine when an excessive amount of the continuous sheet of tab stock is in the infeed accumulation device.

In another embodiment, the outfeed loop sensor measures a distance to a predetermined portion of the continuous sheet of tab stock in the outfeed accumulation device. The predetermined portion of the continuous sheet of tab stock may optionally comprise one of: a lowermost portion of the continuous sheet of tab stock; and a transition point between a generally linear portion of the continuous sheet of tab stock and a trough of the continuous sheet of tab stock. Additionally or alternatively, the outfeed loop sensor may comprise a first sensor in a first portion of the outfeed accumulation device and a second sensor in a second portion of the outfeed accumulation device. The first sensor is aligned with a position of an insufficient amount of the continuous sheet of tab stock and the second sensor is aligned with a position of an excessive amount of the continuous sheet of tab stock. Accordingly, when a predetermined portion of the continuous sheet of tab stock within the outfeed accumulation device is between the first sensor and the second sensor, a sufficient amount of tab stock is within the outfeed accumulation device.

Yet another aspect of the present invention to provide a first apparatus that performs a first operation on a continuous sheet of material. The first apparatus generally includes, but is not limited to: (1) a servo unit that moves the continuous sheet of material into the first apparatus at a predetermined rate; (2) an apparatus that performs the first operation on at least a portion of the continuous sheet of material in a predetermined period of time; (3) an outfeed device that accumulates the continuous sheet of material after the first operation is performed; and (4) an outfeed sensor that measures a length of the continuous sheet of material in the outfeed device. In one embodiment, a rate of the first operation is adjustable to provide (or accumulate) a predetermined length of the continuous sheet in the outfeed device.

Optionally, the first apparatus may further comprise: an infeed device that accumulates the continuous sheet of material before the first operation is performed, and an infeed sensor that measures a length of the continuous sheet of material in the infeed device. The rate of the first operation is adjustable to accumulate a predetermined length of the continuous sheet in the infeed device. The first apparatus may optionally include a control system that adjusts the rate of the first operation in response to a change in the second rate of the second apparatus. In another embodiment, the servo unit is operable to alter the length of the continuous sheet of material moved into the first apparatus. In one embodiment, a second apparatus that performs a second operation at a second rate receives the continuous sheet of material from the outfeed device.

Optionally, the first apparatus is operable to perform the first operation on a first surface of the continuous sheet of material and a different operation on a second surface of the continuous sheet. In another embodiment, the first apparatus comprises a laser unit that forms an indicia on a predetermined portion of the continuous sheet of material. The laser unit may optionally comprise a first laser unit to form an indicia on the first surface and a second laser unit to form an indicia on the second surface. In one embodiment, the indicia comprise any combination of letters, numbers, symbols, and images arranged in any order or orientation and of any size. In still another embodiment, the continuous sheet of material comprises aluminum tab stock formed into tabs for end closures by a conversion press.

Additionally or alternatively, measuring the length may comprise measuring a change in a distance between the outfeed sensor and a predetermined portion of the continuous sheet of material in the outfeed device. In one embodiment, the predetermined portion measured by the outfeed sensor comprises a lowermost portion of the continuous sheet of material. Alternatively, in another embodiment, the predetermined portion measured by the outfeed sensor comprises a transition point between a generally linear portion and a trough of the continuous sheet of material.

In another embodiment, the outfeed sensor comprises a first outfeed sensor in a first portion of the outfeed device and a second outfeed sensor in a different second portion of the outfeed device. Accordingly, measuring the length comprises determining that a predetermined portion of the continuous sheet of material is between the first outfeed sensor and the second outfeed sensor. If the predetermined portion of the continuous sheet is not between the first and second sensor, an excessive or an insufficient length of the continuous sheet is in the outfeed device. Optionally, the first outfeed sensor is aligned with a position of an insufficient amount of the continuous sheet of material and the second outfeed sensor is aligned with a position of an excessive amount of the continuous sheet of material.

It is yet another aspect of the present invention to provide a method of controlling an input rate and an output rate on a continuous sheet of material. The method generally comprises: (1) accumulating a first length of slack in the continuous sheet of material before the first apparatus performs a first operation; (2) performing the first operation with the first apparatus on the continuous sheet of material; (3) accumulating a second length of slack in the continuous sheet of material after the first apparatus performs the first operation; (4) monitoring the first length of slack and the second length of slack; and (5) adjusting the rate of the first operation performed by the first apparatus to alter at least one of the first length of slack and the second length of slack. The first apparatus can perform the first operation at a variable rate. Optionally, the first operation performed by the first apparatus includes performing an operation one or more of a first surface and a second surface of the continuous sheet of material.

In one embodiment, a laser unit forms a mark on the continuous sheet of material during the first operation. The laser unit may optionally comprise a first laser unit operable to form a mark on the first surface and a second laser unit operable to form a mark on the second surface. In one embodiment, the mark may comprise any combination of letters, numbers, symbols, and images arranged in any order or orientation and of any size.

In one embodiment, an infeed sensor monitors the first length of slack in the continuous sheet of material. An outfeed sensor monitors the second length of slack in the continuous sheet of material. In one embodiment, the infeed and outfeed sensors measure a distance to a predetermined portion of the continuous sheet of material in the first and second lengths of slack. The predetermined portions of the continuous sheet of material may optionally comprise at least one of: a lowermost portion of the continuous sheet of material and a transition point between a generally linear portion and a trough of the continuous sheet of material.

The method may optionally include adjusting a length of the continuous sheet of material drawn into the first apparatus by a servo unit. Alternatively, the method may include adjusting the amount of time for the servo unit to move a predetermined length of the continuous sheet of material into the first apparatus. In one embodiment, the servo unit can move the predetermined length of the continuous sheet of material into the first apparatus in less than about 35 milliseconds. In one embodiment, the first apparatus can perform the first operation at a rate of up to, or greater than, approximately 800 cycles per minute. In another embodiment, the first apparatus can perform the first operation in less than approximately 60 milliseconds.

In another embodiment, a second apparatus that performs a second operation on the continuous sheet of material receives the continuous sheet of material from the second length of slack. The second apparatus can perform the second operation at a second different rate that is not impaired by the rate of the first operation performed with the first apparatus. In yet another embodiment, the second apparatus comprises a conversion press that forms the continuous sheet of material into tabs adapted for interconnection to a container end closure.

As will be appreciated by one of skill in the art, the method and apparatus of the current invention may be used to perform an operation of any type on a continuous sheet of any material including without limitation aluminum, tin, steel, plastic, paper, and combinations thereof. Further, the method and apparatus of the current invention may be used in any coil fed manufacturing process to enable a first apparatus to operate out of phase with other components of the coil fed system and without impairing the operating rate of a second apparatus.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The Summary of the Invention is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF DRAWINGS

The accompanying drawings, which are incorporated herein and constitute a part of the specification, illustrate embodiments of the invention and together with the Summary of the Invention given above and the Detailed Description of the drawings given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. Additionally, it should be understood that the drawings are not necessarily to scale.

Figure 1:
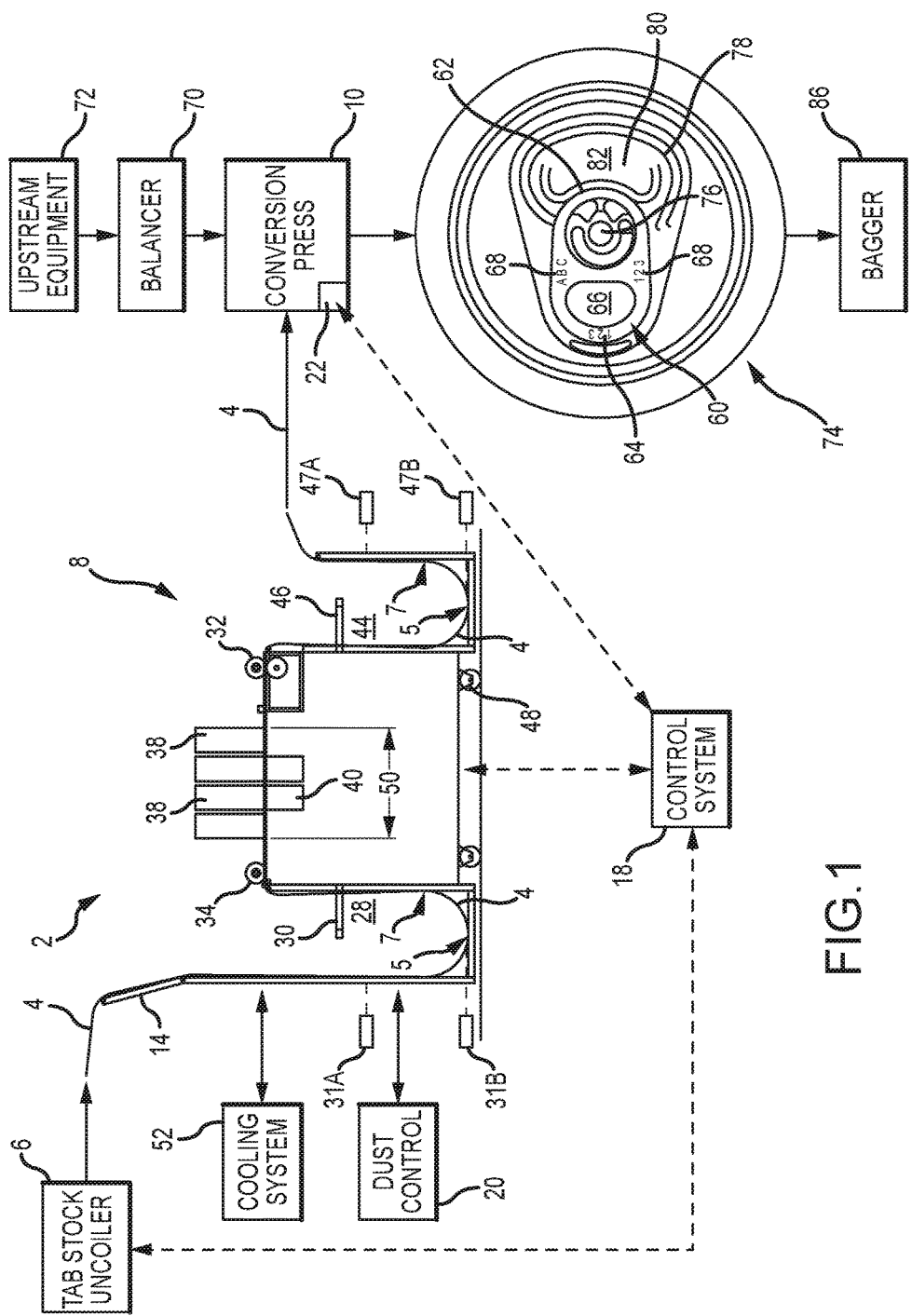
FIG. 1 is a schematic flow diagram of a system of one embodiment of the present invention that includes an apparatus that performs an operation on a continuous sheet of material, the apparatus being removably integrated with an uncoiler and a conversion press of an end closure manufacturing system.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
|---|---|
| 2 | System |
| 4 | Continuous sheet of material |
| 5 | Lowermost portion of the continuous sheet |
| 6 | Uncoiler for the continuous sheet |
| 7 | Transition point of the continuous sheet |
| 8 | Apparatus |
| 10 | Conversion press |
| 14 | Loop stand |
| 18 | Control system |
| 20 | Dust control system |
| 22 | Encoder |
| 26 | Coil of continuous sheet of material |
| 28 | Infeed accumulation device |
| 30 | Infeed loop sensor |
| 31 | Infeed loop sensors |
| 32 | Servo feed unit |
| 34 | Stabilizing roller |
| 35 | Predetermined length of the continuous sheet of material |
| 36 | Portion of sheet material |
| 37 | Width of sheet material |
| 38 | Operation performing unit |
| 40 | Operation performing unit |
| 44 | Outfeed accumulation device |
| 46 | Outfeed loop sensor |
| 47 | Outfeed loop sensors |
| 48 | Alignment system |
| 50 | Operation zone |
| 52 | Cooling system |
| 54 | Upper position |
| 56 | Lower position |
| 60 | Tab |
| 62 | Forward edge of tab |
| 64 | Grasping portion |
| 66 | Aperture in tab |
| 68 | Marks on tab |
| 70 | Balancer |
| 72 | Upstream equipment |
| 74 | End closure |
| 76 | Rivet |
| 78 | Scores |
| 80 | Tear panel |
| 82 | Pour opening |
| 86 | Bagger |
| 90 | Method |
| 92 | Start operation |
| 94 | Activate system |
| 96 | Receive signal from conversion press |
| 98 | Control system sets uncoil rate of uncoiler |
| 100 | Servo feed unit moves continuous sheet into position |
| 102 | Operation performing unit performs operation |
| 104 | Determine if sufficient length of the continuous sheet is available |
| 106 | Adjust cycle rate |
| 108 | Continue performing operations |
| 110 | End operation |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1, a system 2 for performing an operation on predetermined portions of a continuous sheet 4 of material, according to one embodiment of the present invention is illustrated. The system 2 is removably integrated with an uncoiler 6 and a second apparatus 10. The uncoiler 6 is operable to uncoil a coil 26 (illustrated in FIG. 2) of a continuous sheet of material 4. In one embodiment, the continuous sheet comprises tab stock. In one embodiment, the second apparatus comprises a conversion press 10 of an end closure manufacturing process. Although the system 2 and its components are illustrated as integrated with a conversion press 10, it will be appreciated by one of skill in the art that the system 2 of the present invention may be used with any coil fed manufacturing system. More specifically, the present invention could be used in any manufacturing process where the speed of a continuous sheet of material is controlled while an operation is being performed on a selected portion of the continuous sheet of material. Thus, the invention could be used on coils of metallic, plastic, or paper material, and where punching, cutting, shaping, or marking operations are being performed at a certain speed and location.

Figure 2:
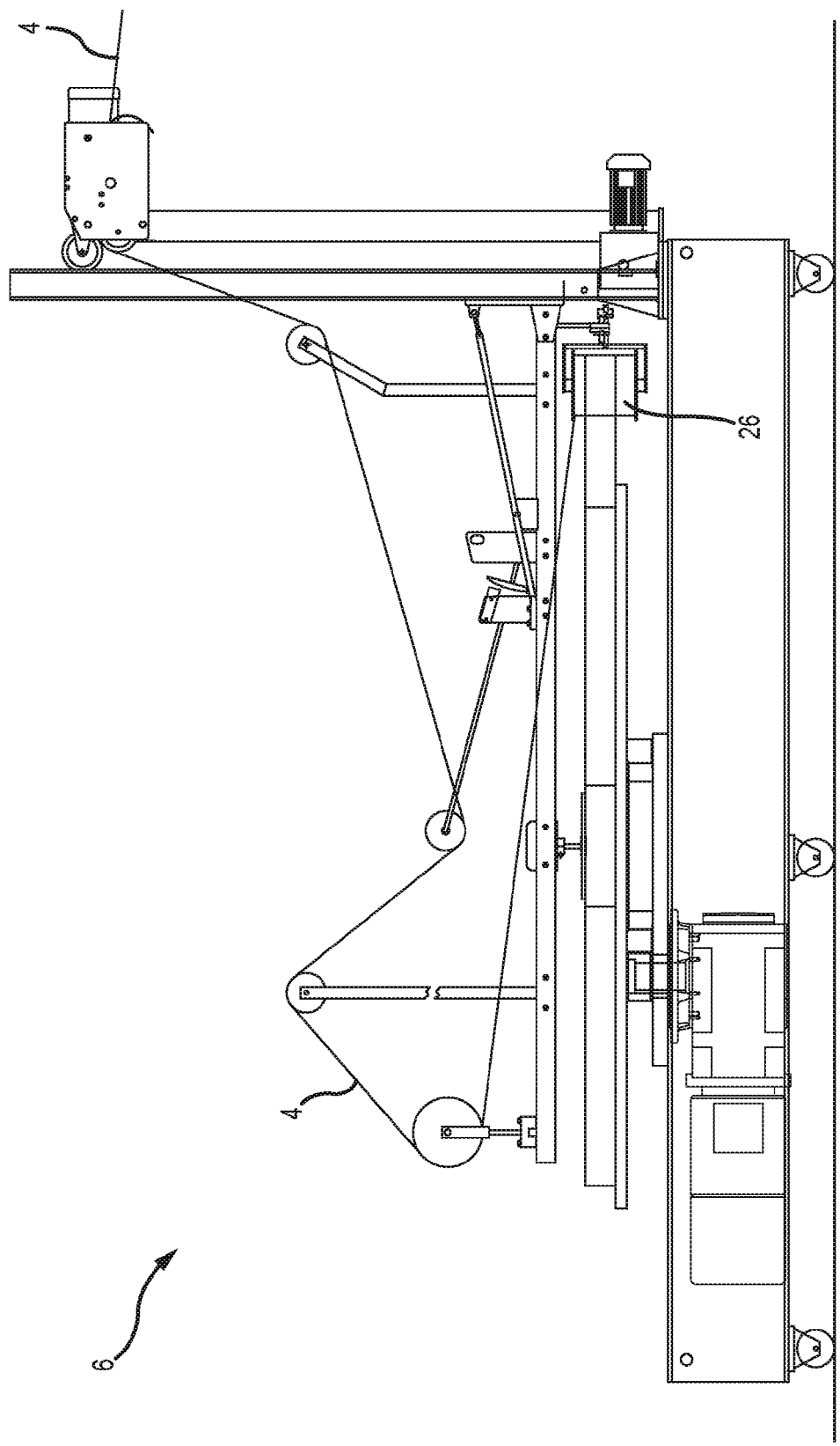
FIG. 2 is a side elevation view of an embodiment of an uncoiler for a continuous sheet of tab stock of the present invention.

The system 2 generally includes an apparatus 8 that performs a predetermined operation on the continuous sheet, a loop stand 14, a control system 18, a dust control system 20, a cooling system 52, and an encoder 22 associated with downstream equipment 10, such as a conversion press. The system 2 receives a continuous sheet 4 of material from the uncoiler 6. The uncoiler 6 uncoils the continuous sheet 4 at a rate determined by the control system 18 of the system 2 as described in more detail below. The uncoil rate may be trimmed (or adjusted) by a position arm (not illustrated) of the uncoiler 6. Suitable uncoilers 6 are known to those of skill in the art and are available from a variety of suppliers including, for example, ASC Machine Tools, Inc., and Perfecto Industries, Inc., among others. An embodiment of an uncoiler 6 is illustrated in FIG. 2.

The uncoiler 6 may receive one or more coils 26 of the continuous sheet 4 material. Each coil 26 typically has a length of approximately 9,000 feet or more of sheet material. The continuous sheet 4 may be formed of an aluminum alloy or any other suitable material including without limitation steel, tin, plastic, paper and any combination thereof. In one embodiment, the continuous sheet 4 is formed of an aluminum alloy commonly referred to by those of skill in the art as 5042 aluminum.

The apparatus 8 generally includes an infeed accumulation device 28, infeed loop sensors 30, 31, a servo feed unit 32, a stabilizing roller 34, units 38, 40 that perform the operation on the continuous sheet, a cooling system 52, an outfeed accumulation device 44, outfeed loop sensors 46, 47, and an alignment system 48.

The loop stand 14 receives the continuous sheet 4 from the uncoiler 6 and aligns the continuous sheet 4 with the apparatus 8. The continuous sheet 4 enters the infeed accumulation device 28 of the apparatus 8. In one embodiment, the infeed accumulation device 28 is up to about 18 inches wide, up to about 24 inches long, and has a height of up to about 75 inches. In another embodiment, the infeed accumulation device 28 is about 13 inches wide, about 18 inches long, and the height is about 75 inches. In a more preferred embodiment, the width is about 12 inches, the length is about 16 inches, and the height is about 50 inches.

The infeed loop sensor 30 measures a distance from the sensor 30 to a predetermined portion 5, 7 of the continuous sheet 4 in the infeed accumulation device 28. In one embodiment, the infeed loop sensor 30 includes a laser. The sensor 30 receives reflected laser energy from the continuous sheet and uses the reflected laser energy to measure the distance to the predetermined portion 5, 7 at any angle. In one embodiment, the sensor 30 measures the distance to a lowermost portion 5 of the continuous sheet 4 in infeed accumulation device 28. In one embodiment, the lowermost portion 5 comprises a trough of the sheet 4 in the infeed accumulation device 28. In another embodiment, the sensor 30 measures a distance between the sensor and a transition point 7 from a generally linear portion of the sheet 4 to a trough of the sheet 4. In one embodiment, the sensor is positioned to sense an interior portion of a concavity formed by the continuous sheet as illustrated in FIG. 1. However, it will be appreciated that the sensor 30 may be arranged differently. For example, in another embodiment, the sensor 30 may be positioned to sense an exterior portion of the concavity formed by the continuous sheet. Said another way, although sensor 30 is illustrated in FIG. 1 positioned above the lowermost portion 5 of the continuous sheet, sensor 30 may optionally be positioned below the lowermost portion 5. Accordingly, in one embodiment, the sensor 30 senses a first side of the continuous sheet. In another embodiment, the sensor 30 senses a second side of the continuous sheet.

Alternatively, sensors 31A, 31B may be arranged to monitor the position of the continuous sheet 4 in the infeed accumulation device 28. Sensor 31A provides a first signal to the control system 18 when sensor 31A detects the continuous sheet. Continuing this example, when sensor 31A does not detect the continuous sheet, sensor 31A provides a second signal to the control system 18. Similarly, sensor 31B in a different portion of the infeed accumulation device 28 also provides a first signal when the continuous sheet is detected and a different second signal when the continuous sheet is not detected. Sensors 31A, 31B may optionally include a laser. The sensors 31A, 31B may be positioned to receive laser energy reflected from a predetermined portion of the continuous sheet 4 to determine the amount of the continuous sheet in the infeed accumulation device.

The control system 18 receives information associated with the position of the continuous sheet 4 in the infeed accumulation device 28 from one or more of the infeed loop sensors 30, 31. Using the information from the sensors 30, 31, the control system 18 can determine the length of the continuous sheet 4 in the infeed accumulation device 28. For example, the control system can determined there is an excessive length, a sufficient length, or an insufficient length of the continuous sheet in the infeed accumulation device 28. The control system 18 can then send a signal to the uncoiler 6 to increase the uncoil rate if an insufficient length of continuous sheet 4 is detected in infeed accumulation device 28. Alternatively, the control system 18 can send a signal to the uncoiler 6 to decrease the uncoil rate if an excessive length of continuous sheet 4 is detected in infeed accumulation device 28. In one embodiment, the control system 18 sends signals to the uncoiler 6 to adjust the uncoil rate to keep length of continuous sheet in infeed accumulation device 28 substantially constant.

In one embodiment, the control system receives a distance between the sensor 30 and a predetermined portion of the continuous sheet. In one embodiment, the predetermined portion comprises the lowermost portion 5 of the continuous sheet 4 in the infeed accumulation device 28. In another embodiment, the predetermined portion comprises a transition point 7 of the continuous sheet 4 in the infeed accumulation device 28.

Optionally, in another embodiment, when the sensor 31A in a first portion of the infeed accumulation device 28 does not detect the continuous sheet and sends the second signal to the control system, the control system can determine that an insufficient length of continuous sheet 4 is detected in infeed accumulation device 28. Similarly, when the sensor 31A detects the continuous sheet and the sensor 31B in a second portion of the infeed accumulation device 28 does not detect the continuous sheet, the control system can determine that the lowermost portion 5 of the continuous sheet 4 is between sensors 31A and 31B. Accordingly, the control system will determine that a sufficient length of the continuous sheet is in the infeed accumulation device 28. Continuing this example, when the sensor 31B detects the continuous sheet and sends the first signal to the control system, the control system can determine that too great a length of the continuous sheet 4, or an excessive length, is detected in infeed accumulation device 28.

Suitable control systems 18 are known to those of skill in the art. The control system 18 may be any programmable logic controller (PLC). One example of a suitable PLC is a Controllogix PLC produced by Rockwell Automation, Inc, although other PLCs are contemplated for use with embodiments of the present invention.

The servo feed unit 32 is operable to receive a signal from the control system 18 to move a predetermined length 35 (illustrated in FIG. 3) of the continuous sheet 4 at a predetermined rate into an operation zone 50 where a selected operation is performed on the continuous sheet by one or more units 38, 40. Optionally, in one embodiment, the action comprises a laser marking operation performed by laser units 38, 40. The servo feed unit 32 may be adapted to either push or pull the continuous sheet 4 into the operation zone 50. Alternatively, in one embodiment of the present invention, the servo feed unit 32 may comprise two or more servo feed units that operate together to push and pull the continuous sheet 4 into the operation zone 50. Any suitable servo feed unit 32 may be used with the system 2 of the present invention. In one embodiment, the servo feed unit 32 is operable to move the predetermined length 35 of continuous sheet 4 into the operation zone 50 in no more than approximately 35 milliseconds. In a more preferred embodiment, the servo feed unit 32 can move the predetermined length of continuous sheet 4 into the operation zone 50 in less than approximately 30 milliseconds. Suitable servo feed units 32 are known to those of skill in the art.

The rate at which the servo feed unit 32 moves the continuous sheet 4 into the apparatus 8 may be faster or slower than the uncoil rate of the uncoiler 6. The control system 18 may change the input speed of the servo feed unit 32 to alter the cycle rate of the system 2. The servo feed unit 32 generally moves the continuous sheet 4 to the operation zone 50 at a rate faster than the intake rate of the conversion press 10. In this manner, the amount of time available for the operation performed by the units 38, 40 can be increased without increasing the cycle time of the system 2, ensuring that the conversion press 10 can draw in the continuous sheet 4 of material without operating at a slower cycle rate. In one embodiment where the operation comprises laser marking of the continuous sheet, increasing the time available for marking also allows the laser units 38, 40 to form more complex marks on the continuous sheet 4. In addition or alternatively, increasing the time available for marking reduces the amount of energy required by the laser units 38, 40 to form marks 68 on the continuous sheet 4, reducing the operating cost of the system 2.

The control system 18 may automatically alter the length 35 of the continuous sheet 4 that is moved into the operation zone 50 to adjust the location of the operation performed on the continuous sheet 4 in response to a signal received from the encoder 22. Additionally, an operator of the system 2 may adjust the cycle time and the intake length 35 of the continuous sheet 4 by a user interface of the control system 18. Accordingly, the control system 18 may advance the continuous sheet 4 automatically, or in response to operator input, to perform the operation, such as forming a mark with a laser, on a predetermined portion of the continuous sheet 4. In this manner, the mark is properly positioned on a tab 60 subsequently formed from the continuous sheet by the conversion press 10.

While the continuous sheet is moved into the operation zone 50, the stabilizing roller 34 of the apparatus 8 stabilizes the continuous sheet 4. In one embodiment, the apparatus 8 includes a plurality of stabilizing rollers 34 in a variety of locations before and after the units 38, 40.

After the predetermined length 35 of continuous sheet 4 has been positioned in the operation zone 50, the servo feed unit 32 stops while the units 38, 40 perform the operation on the continuous sheet 4. For example, in one embodiment, the units 38, 40 are laser units that form marks 68 on the continuous sheet. Alternatively, any type of operation besides a laser could be used to mark, print, form, cut, shape, or alter the continuous sheet material. Optionally, a hold fixture (not illustrated) of the apparatus 8 may engage the continuous sheet 4 when the servo feed unit stops to prevent unintended or inadvertent movement during operations performed by the units 38, 40.

As the continuous sheet 4 is substantially stationary in the operation zone 50 during the operations performed by the units 38, 40, the uncoiler 6 may continue to uncoil the continuous sheet 4, increasing the amount of continuous sheet 4 in the infeed accumulation device 28. Likewise, the down-stream equipment 10 may continue to draw in the continuous sheet 4 at a predetermined speed, thereby decreasing the amount of continuous sheet 4 in the outfeed accumulation device 44 as will be described in more detail hereinafter in conjunction with FIGS. 5A-5C.

Figure 3:
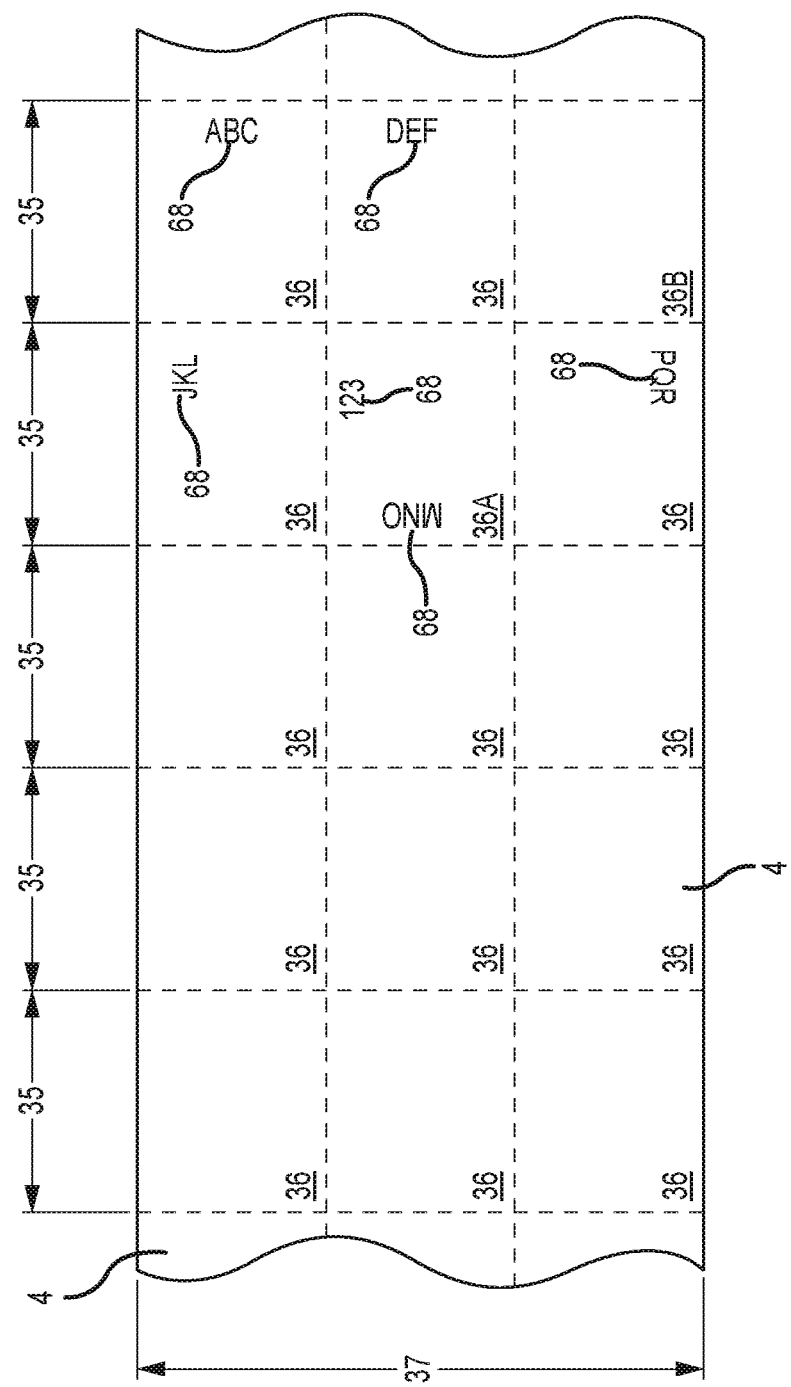
FIG. 3 is a partial top plan view of a portion of a continuous sheet of tab stock that is partially-marked according to an embodiment of the present invention.

Referring now to FIG. 3, in one embodiment, the units 38, 40 comprise lasers that mark predetermined portions 36 of a continuous sheet of tab stock 4 that will subsequently be formed into tabs 60 by the conversion press 10. The markings 68 may be in any orientation and any location within each portion 36 of the tab stock 4. Additionally, each portion 36 may have more than one marking 68 with each marking having a different orientation, as illustrated by portion 36A. Optionally, at least one portion 36B within each length 35 of tab stock 4 may be left unmarked. In one embodiment, the markings have a height of up to approximately 0.125 inches. The tab stock 4 has a width 37 sufficient for the conversion press 10 to form a number of tabs 60 from each predetermined length 35 of the tab stock 4. In one embodiment, the tab stock 4 has a width 37 sufficient for three portions 36 within each length 35 that may subsequently be formed into three tabs 60. However, one of skill in the art will appreciate that the width of the tab stock 4 may be increased or decreased to a width sufficient for the conversion press 10 to form more or fewer tabs 60 from each predetermined length 35 of the tab stock 4.

The units 38, 40 may perform operations on either or both sides of the continuous sheet 4 substantially simultaneously. Accordingly, in an embodiment where the continuous sheet comprises tab stock material, when the conversion press 10 forms the continuous sheet 4 into tabs 60, the upper (or external) surface of the tab 60 visible to the consumer and the lower surface of the tab 60 (which is not initially visible to the consumer) may both include one or more markings 68. Markings on the lower surface of the tab 60 will be visible to the consumer after a grasping portion 64 of the tab 60 is lifted to sever a score 78 and depress a tear panel 80 of the end closure 74 to open a pour opening 82.

Referring again to FIG. 1, the apparatus 8 may include any number of units 38, 40. For example, the apparatus may include any number of units 38 arranged to perform an operation on a first side of the continuous sheet. Additionally or alternatively, the apparatus may also include any number of units 40 to perform an operation on a second side of the continuous sheet. The number and positions of the tooling or lasers of unit 38 may be the same as, or different from, the number and positions of the tooling or lasers of unit 40. In one embodiment, the apparatus 8 includes from one to four laser units 38 to mark the first side of the continuous sheet and from one to four laser units 40 to mark the second side of the continuous sheet substantially simultaneously with the first side. In one embodiment, the laser units 38, 40 are operable to mark the continuous sheet 4 in less than approximately 60 milliseconds, and more preferably, in less than about 50 milliseconds. Optionally, in one embodiment, the continuous sheet 4 may be advanced one or more times for marking by one or more laser units 38, 40 to complete each marking, or to form more complex markings.

In one embodiment, the laser units 38 may be substantially the same as, or different from, the laser units 40. In another embodiment, the laser units 38, 40 include one or more Nd:YAG lasers (also known as neodymium-doped yttrium aluminum garnet lasers) with a wavelength of approximately 1.064 μm. In yet another embodiment, the laser units 38, 40 provide an output from about 40 Watts to about 140 Watts of applied power, with about 80% of such power being delivered to a target area of the continuous sheet 4. In still another embodiment, the laser units 38, 40 provide a pulsed or intermittent form of laser light. In one embodiment, the laser units 38, 40 can provide pulses at from approximately 3,000 Hz to approximately 65,000 Hz. Preferably the output laser light pulses are relatively stable in the sense that there is relatively little variation in power from one pulse to the next and substantially all pulses have sufficient power to vaporize or ablate the material of the target area of the continuous sheet 4 sufficiently to produce a visible spot or mark. In still another embodiment, the laser units 38, 40 are operable to mark approximately 1,300 characters per second and approximately 50 feet of continuous sheet material per second. In one embodiment, the laser units 40 may be of a different type, or operate at a different power level, than the laser units 38. Laser units 38, 40 that can be used in this regard are known by those of skill in the art and are available from a variety of suppliers.

The apparatus 8 may optionally include a cooling system 52 to maintain the units 38, 40 at a predetermined temperature. Suitable cooling systems 52 are known to those of skill in the art and may use a variety of methods to maintain the predetermined temperature of the units 38, 40. In one embodiment, the cooling system 52 is external to the apparatus 8 and the apparatus 8 includes one or more cooling ports for integration with the external cooling system 52.

After the operations are completed by the units 38, 40 or other device, the continuous sheet 4 optionally passes through a dust control system 20. The dust control system 20 removes debris from the continuous sheet 4 by any suitable method. In one embodiment, the dust control system 20 uses one or more of a stream of a gas, a stream of a liquid, suction, and brushes that contact either or both surfaces of the continuous sheet 4 to clean away debris. The dust control system 20 may be positioned before or after the servo feed unit 32. The apparatus 8 may include a number of ports or apertures to interconnect the dust control system 20. Any dust control system 20 known to those of skill in the art may be used with the system 2 of the present invention.

Optionally, after the units 38, 40 perform their operations, one or both sides of the continuous sheet 4 may receive a coating of a lubricant from a lubrication system (not illustrated). In one embodiment, the lubrication system is interconnected to the conversion press 10. In another embodiment, the lubrication system is interconnected to the apparatus 8. Suitable lubrication systems operable to provide the lubricate to the strip of continuous sheet 4 are known to those of skill in the art and may be obtained from a variety of suppliers such as, but not limited to, UNIST Inc.

After the units 38, 40 perform their operations, the continuous sheet 4 accumulates in the outfeed accumulation device 44 until dawn into the conversion press 10. The outfeed accumulation device 44 is similar to a balancer in a production process as will be recognized by one of skill in the art. The outfeed accumulation device 44 may have the same or different dimensions than the infeed accumulation device 28. In one embodiment, the outfeed accumulation device 44 is up to about 18 inches wide, up to about 24 inches long, and has a height of up to about 75 inches. In another embodiment, the outfeed accumulation device 44 is about 13 inches wide, about 18 inches long, and the height is about 75 inches. In a more preferred embodiment, the width is about 12 inches, the length is about 16 inches, and the height is about 50 inches.

The sensors 46, 47 of the outfeed accumulation device 44 may be the same as, similar to, or different from, the sensors 30, 31. In one embodiment, the sensors 46, 47 may be arranged in substantially the same positions as sensors 30, 31. Further, in embodiments, sensors 46, 47 may include, or be associated, with a laser. The laser may be positioned with a predetermined alignment to the continuous sheet 4. Accordingly, the sensors 46, 47 may be positioned to receive laser energy reflected from a predetermined portion of the continuous sheet 4 to determine the amount of the continuous sheet 4 in the outfeed accumulation device 44.

The outfeed loop sensor 46 measures a distance from the sensor 46 to a predetermined portion 5, 7 of the continuous sheet 4 in the outfeed accumulation device 44. In one embodiment, the sensor 46 measures the distance to a lowermost portion 5 of the continuous sheet 4 in outfeed accumulation device 44. In one embodiment, the lowermost portion 5 comprises a trough of the sheet 4 in the outfeed accumulation device 44. In another embodiment, the sensor 46 measures a distance between the sensor and a transition point 7 from a generally linear portion of the sheet 4 to a trough of the sheet 4. In one embodiment, the sensor 46 is positioned to sense an interior portion of a concavity formed by the continuous sheet as illustrated in FIG. 1. However, it will be appreciated that the sensor 46 may be arranged differently. For example, in another embodiment, the sensor 46 is positioned to sense an exterior portion of the concavity formed by the continuous sheet. Said another way, although sensor 46 is illustrated in FIG. 1 positioned above the lowermost portion 5 of the continuous sheet, sensor 46 may optionally be positioned below the lowermost portion 5 or in any other position which allows the length of the continuous sheet of material 4 to be measured within outfeed accumulation device 44. Accordingly, in one embodiment, the sensor 46 senses a first side of the continuous sheet. In another embodiment, the sensor 46 senses a second side of the continuous sheet 4.

Alternatively, sensors 47A, 47B may be arranged to monitor the position of the continuous sheet 4 in the outfeed accumulation device 44. Sensor 47A provides a first signal to the control system 18 when sensor 47A detects the continuous sheet. Continuing this example, when sensor 47A does not detect the continuous sheet, sensor 47A provides a second signal to the control system 18. Similarly, sensor 47B in a different portion of the outfeed accumulation device 44 also provides a first signal when the continuous sheet is detected and a different second signal when the continuous sheet is not detected.

The control system 18 can determine the length of the continuous sheet 4 in outfeed accumulation device 44 from the information received from one or more of sensors 46, 47. The control system 18 monitors the length of the marked continuous sheet 4 in outfeed accumulation device 44 to ensure a sufficient, uninterrupted flow of the continuous sheet 4 into the conversion press 10. The control system 18 can accumulate the continuous sheet 4 in outfeed accumulation device 44 to ensure the conversion press 10 is supplied with the continuous sheet 4 of material by increasing or decreasing the cycle time of the apparatus 8. In this manner, the conversion press 10 can draw in continuous sheet 4 from the outfeed accumulation device 44 as required without stressing or stretching the continuous sheet 4.

The control system 18 can increase or decrease the cycle time of the system 2 to ensure a sufficient length of continuous sheet 4 is maintained in outfeed accumulation device 44 to enable the conversion press 10 to operate without slowing down. In one embodiment, the maximum allowable cycle time for the system 2 to perform a selected operation and advance the continuous sheet 4 is approximately 80 milliseconds for a conversion press 10 operating at 750 cycles per minute. This allows approximately 30 milliseconds for the servo feed unit 32 to move the continuous sheet 4 into the operation zone 50 and approximately 50 milliseconds for the units 38, 40 to perform an operation on the continuous sheet 4. Optionally, in one embodiment, the servo feed unit can move the continuous sheet into the operation zone is less than about 25 milliseconds such that the units have approximately 55 milliseconds to perform the operation on the continuous sheet. In one embodiment, the system 2 can operate at up to approximately 800 cycles per minute.

The control system 18 can also receive a variety of signals from the encoder 22 associated with the conversion press 10. The signals from the encoder 22 can indicate that the conversion press 10 is operating, is ready, and/or is not operational. The signals may also include the cycle rate (or operating speed) of the conversion press and a desired location for the operation to be performed on the continuous sheet 4. The control system 18 can use the signals received from the encoder 22 to change the cycle rate of the apparatus 8 and the length 35 of continuous sheet 4 moved into the operation zone 50 during each cycle of the apparatus 8.

Figure 4A:
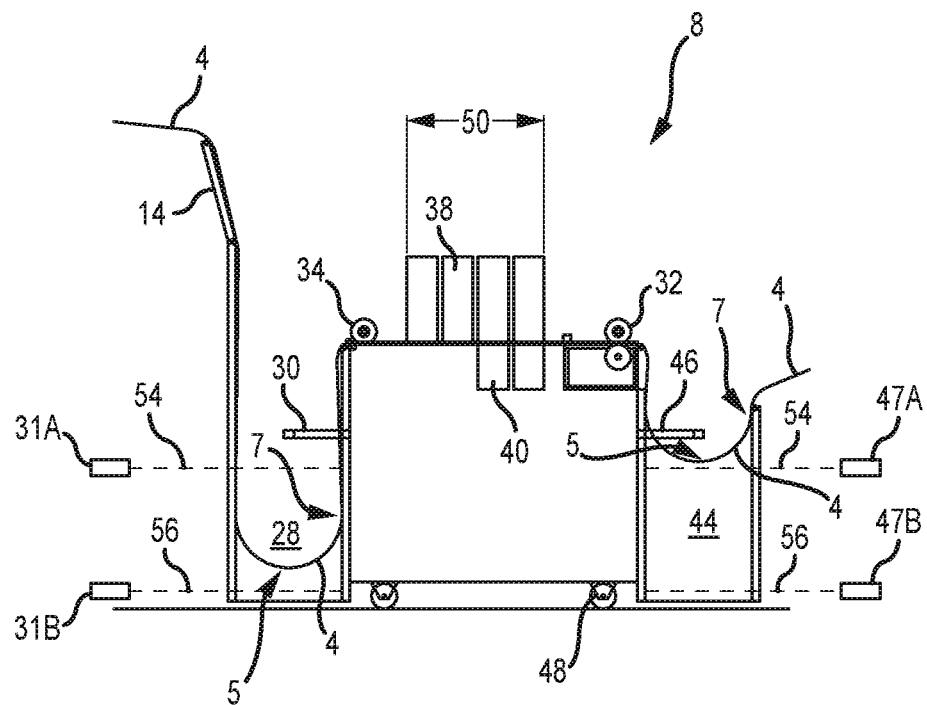
FIG. 4A is a side elevation view of one embodiment of an apparatus of the present invention illustrating an insufficient length of a continuous sheet of material in an outfeed accumulation device of the apparatus.

Referring now to FIG. 4A, when the continuous sheet 4 in the outfeed accumulation device 44 is above a predetermined position, for example, upper position 54, the height of the continuous sheet 4 is too high and there is an insufficient length of continuous sheet 4 in outfeed accumulation device 44. In response, the control system 18 may send a signal to the servo feed unit 32 and the units 38, 40 to increase the cycle rate of the apparatus 8 to be faster than the intake rate of the conversion press 10. In this manner, the length of continuous sheet 4 in outfeed accumulation device 44 is increased. Increasing the cycle rate of the apparatus 8 may decrease the amount of time available for the units 38, 40 to perform their operations on the continuous sheet 4. In one embodiment, the control system 18 can send a signal to the servo feed unit 32 to increase the input speed of the continuous sheet to reduce the time required move the continuous sheet 4 into the marking zone 50 to less than about 30 milliseconds. Accordingly, the cycle rate of the apparatus 8 can be increased without decreasing the time available for the operation performed by the units 38, 40. In this manner, when the operation is a laser mark formed on the continuous sheet, the cycle rate of the apparatus can be increased without decreasing the time available for marking by the laser units 38, 40 and without decreasing the quality of the marking applied to the continuous sheet 4. Alternatively, in another embodiment, the control system 18 can send a signal to temporarily increase the power used by the laser units 38, 40 to make the mark to decrease the marking time. The control system can also send a signal to the apparatus 8 to decrease the quality or size of markings formed by the laser units. In this manner, the markings can be formed in less time to temporarily increase the cycle rate of the apparatus 8. Optionally, in one embodiment, the control system 18 may send a signal to change the intake rate, or to stop the intake, of the continuous sheet 4 by the conversion press 10.

Figure 4B:
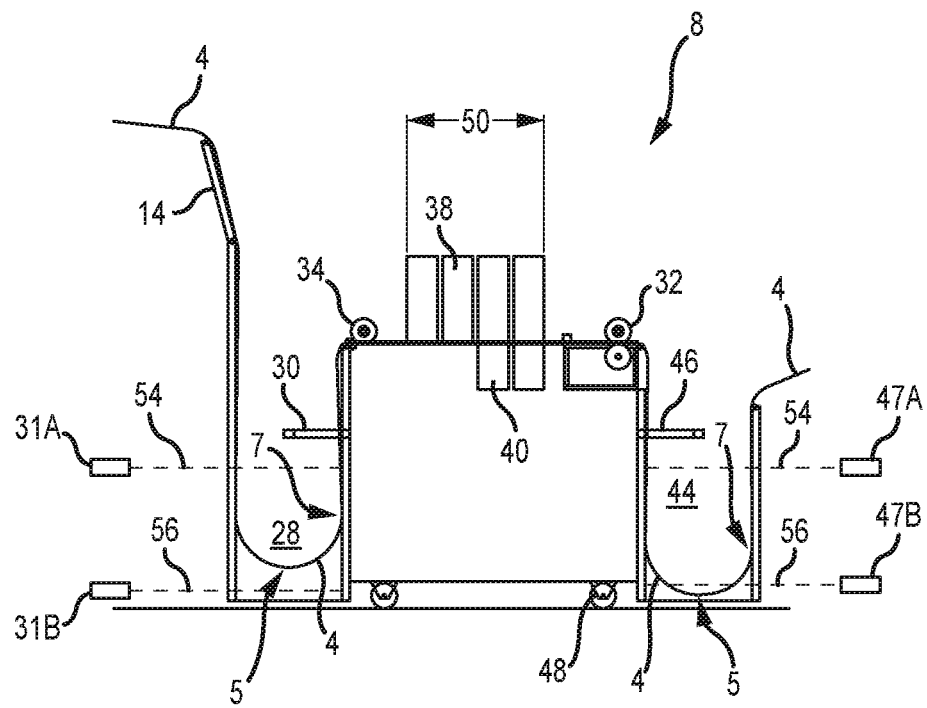
FIG. 4B is a side elevation view of the apparatus of FIG. 4A illustrating an excessive length of the continuous sheet of material in the outfeed accumulation device of the apparatus.

Referring now to FIG. 4B, when the continuous sheet 4 in the outfeed accumulation device 44 is below a predetermined position, illustrated by lower position 56, the distance from sensor 46 to the predetermined portion 5 or 7 of the continuous sheet 4 is too great. Optionally, the sensor 47B can send the first signal after detecting the continuous sheet 4 in the position illustrated in FIG. 4B. In response, the control system 18 may determine that there is too much continuous sheet 4 in outfeed accumulation device 44. The control system 18 may send a signal to the servo feed unit 32 and the units 38, 40 to decrease the cycle rate of the apparatus 8 to be slower than the intake rate of the conversion press 10. Decreasing the cycle rate of the apparatus 8 will decrease the length of continuous sheet 4 in device outfeed accumulation 44. Optionally, when the cycle rate of the apparatus is decreased, the serve feed unit 32 moves the continuous sheet 4 into the marking zone 50 at the same rate but the laser units 38, 40 operate at a lower power level. In this manner, the laser units take more time to form marks on the continuous sheet 4, but forming the marks requires less energy. Optionally, in an embodiment, the power level of the laser units 38, 40 may be adjusted by between 0% and 100%.

It will be appreciated by one of skill in the art that positions 54 and 56 may be varied (set lower or higher) by a user. Further, the positions 54, 56 may be set at different heights in each of the infeed and outfeed devices 28, 44. In one embodiment, sensors 31A and 47A may generally be aligned with positions 54 in the infeed and outfeed devices 28, 44. Similarly, in another embodiment, sensors 31B, 47B may generally be aligned with positions 56 in the infeed and outfeed devices 28, 44.

Figure 5A:
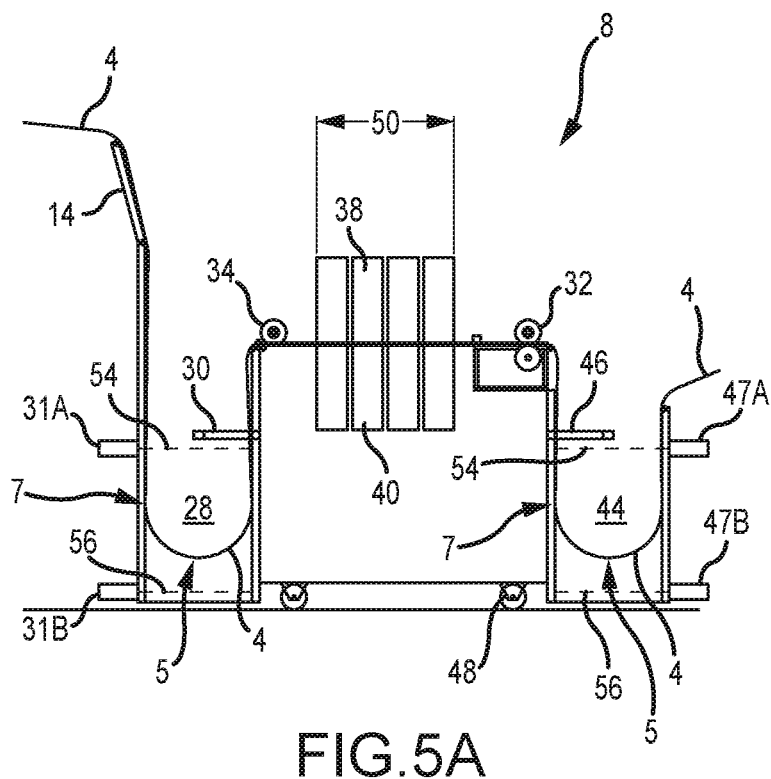
FIG. 5A is a side elevation view of an apparatus of the present invention illustrating a first position of the continuous sheet of material in an infeed accumulation device and an outfeed accumulation device during a cycle of the apparatus.
Figure 5B:
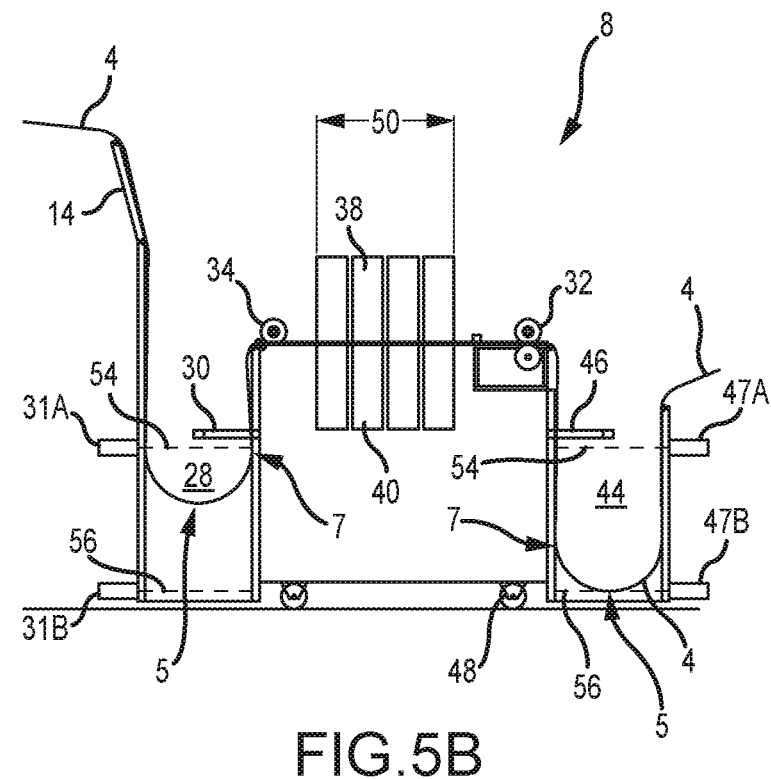
FIG. 5B is a side elevation view of the apparatus of FIG. 5A illustrating a second position of the continuous sheet of material in the infeed and outfeed accumulation devices during the cycle of the apparatus.
Figure 5C:
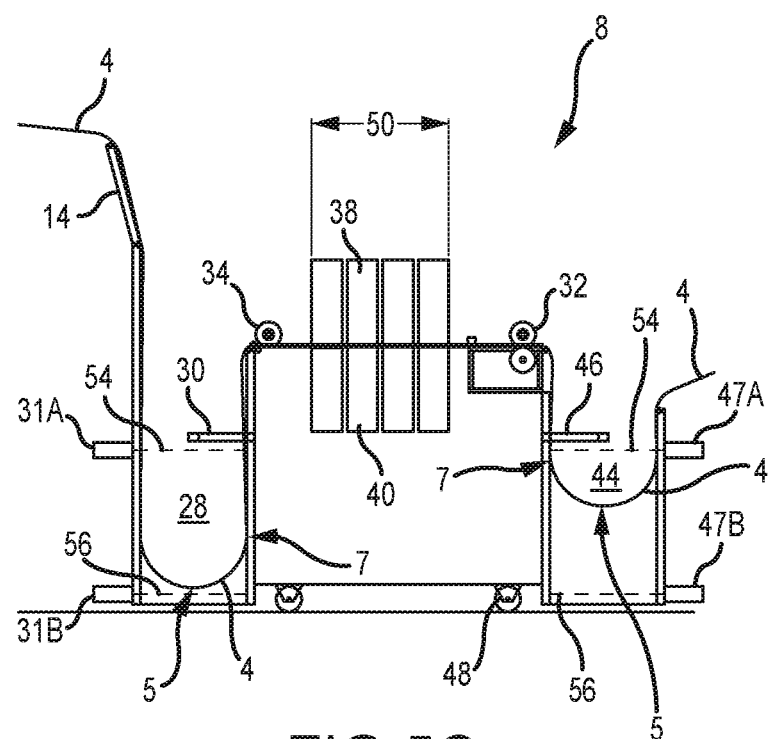
FIG. 5C is a side elevation view of the apparatus of FIG. 5A illustrating a third position of the continuous sheet of material in the infeed and outfeed accumulation devices during the cycle of the apparatus.

Referring now to FIGS. 5A-5C, the movement of continuous sheet 4 through the infeed and outfeed accumulation devices 28, 44 during a cycle of the apparatus 8 are illustrated. An initial position of the continuous sheet 4 is illustrated in the infeed and outfeed accumulation devices 28, 44 in FIG. 5A. The continuous sheet is between upper position 54 and lower position 56 and thus there is a sufficient length of continuous sheet 4 in devices 28, 44.

Referring now to FIG. 5B, after the servo feed unit 32 moves the predetermined length 35 of continuous sheet 4 into the zone 50, the length of continuous sheet 4 in the infeed accumulation device 28 may temporarily decrease. The length of continuous sheet 4 in the outfeed accumulation device 44 may temporarily increase. However, as illustrated in FIG. 5B, the control system 18 is operable to control the input rate of the servo feed unit 32 such that the length of continuous sheet 4 in the outfeed accumulation device 44 is not too long by preventing the continuous sheet 4 from crossing below the lower position 56.

Referring now to FIG. 5C, as previously mentioned, during the operation performed by the units 38, 40, the continuous sheet 4 is maintained substantially stationary in the operation zone 50 by the stabilizing roller 34. However, the conversion press 10 continues to draw in continuous sheet 4 at a predetermined rate. Accordingly, the length of continuous sheet 4 in the outfeed accumulation device 44 may decrease as the units 38, 40 perform their operations on the continuous sheet 4. The length of continuous sheet 4 in the infeed accumulation device 28 may increase as the uncoiler 6 continues to uncoil the unmarked continuous sheet 4. In one embodiment, the control system 18 may send a signal to stop the uncoiler 6 while the units 38, 40 perform operations on the continuous sheet 4. In this manner, the length of continuous sheet 4 in the infeed accumulation device 28 may remain substantially constant. After the units 38, 40 finish their operations on the continuous sheet 4, the control system 18 sends a signal to the servo feed unit 32 to move another predetermined length 35 of continuous sheet 4 into position in the operation zone 50. The lengths of continuous sheet 4 in devices 28, 44 may then be substantially as illustrated in either FIG. 5A or FIG. 5B.

Referring again to FIG. 1, the apparatus 8 optionally includes an alignment system 48 to facilitate installation and removal of the apparatus 8 between the uncoiler 6 and the conversion press 10 as necessary. The alignment system 48 may include cart stops (not illustrated) that interconnect to connectors located at predetermined positions in the production facility. Alternatively, the connectors may be positioned on the conversion press 10 or on a loop stand associated with the conversion press 10. The alignment system 48 enables the apparatus 8 to be integrated with the conversion press efficiently with a minimum of down time. When the downstream equipment 10 does not require the operation performed by the units 38, 40 of the apparatus 8, the apparatus can be quickly removed from the system 2. For example, in one embodiment, if a batch of end closures 74 does not require marking 68 on the tabs 60, the apparatus 8 can be quickly removed by releasing the cart stops of the alignment system 48. Optionally, when a batch of end closures 74 does not require marked tabs 60, the apparatus 8 can be left in position with the laser units 38, 40 and the servo feed unit 32 turned off or in a neutral position. The continuous sheet 4 can then freely pass through the apparatus 8 at a rate equal to the intake rate of the conversion press 10.

The conversion press 10 draws in the marked continuous sheet 4 as needed from the outfeed accumulation device 44. The conversion press 10 includes tools operable to form the continuous sheet 4 received from the system 2 into a tab 60 of any predetermined size or shape. The tab 60 generally includes a forward edge 62 and a grasping portion 64. Optionally, the conversion press 10 may form an aperture 66 in the grasping portion 64 of the tab 60. However, as will be appreciated by one of skill in the art, the conversion press 10 may optionally form the tab 60 with a closed web in the grasping portion 64 to provide a larger structure on the tab 60 for marking and grasping by a consumer.

A plurality of marks 68 may be positioned in any predetermined portion of the tab 60 in any orientation. It will be appreciated that marks 68 may be formed at any location on the tab 60, including the lower surface (not illustrated) of the tab 60 facing the exterior surface of the end closure 74. Further, the marks 68 may include any combination of text, numerals, customer identification information, branding information, directions of use, sweepstakes tokens, images, or any other desired decoration or indicia of any size.

The conversion press 10 also receives end closure shells (not illustrated) from a balancer 70. The balancer 70, in one embodiment, is a mechanical sponge that controls the flow of the end closure shells to the conversion press 10 from other upstream equipment 72, such as a shell press, used in the end closure manufacturing process. The balancer 70 maintains the proper speed and flow of the end closure shells to ensure a consistent, non-interrupted flow of end closure shells into the conversion press 10. The balancer 70 can accumulate end closure shells to ensure the conversion press 10 is supplied with end closure shells if the upstream equipment 72 goes offline, for example, for maintenance, during unscheduled stops, or when a new coil of sheet metal used to form the end closure shells is loaded in an uncoiler (not illustrated).

The conversion press 10 contains multiple progressive die sets which raise a rivet 76 in the end closure 74. Although the rivet 76 is illustrated in FIG. 1 substantially centered on the end closure 74, one of skill in the art will recognize that the rivet 76 may be located at any predetermined location of the end closure 74. In one embodiment, the rivet 76 is not centered on the end closure 74. The conversion press 10 also includes tools to form severable scores 78 to define a tear panel 80 that may be opened to create a pour opening 82. After forming the end closure 74, the conversion press 10 interconnects the tab 60 to the rivet 76.

The completed end closures 74 may then be sent to a bagger 86. The bagger 86 counts and inserts a predetermined number of the end closures 74 into packages such as sacks or bags made of any desired material including paper, plastic, or cardboard.

Figure 6:
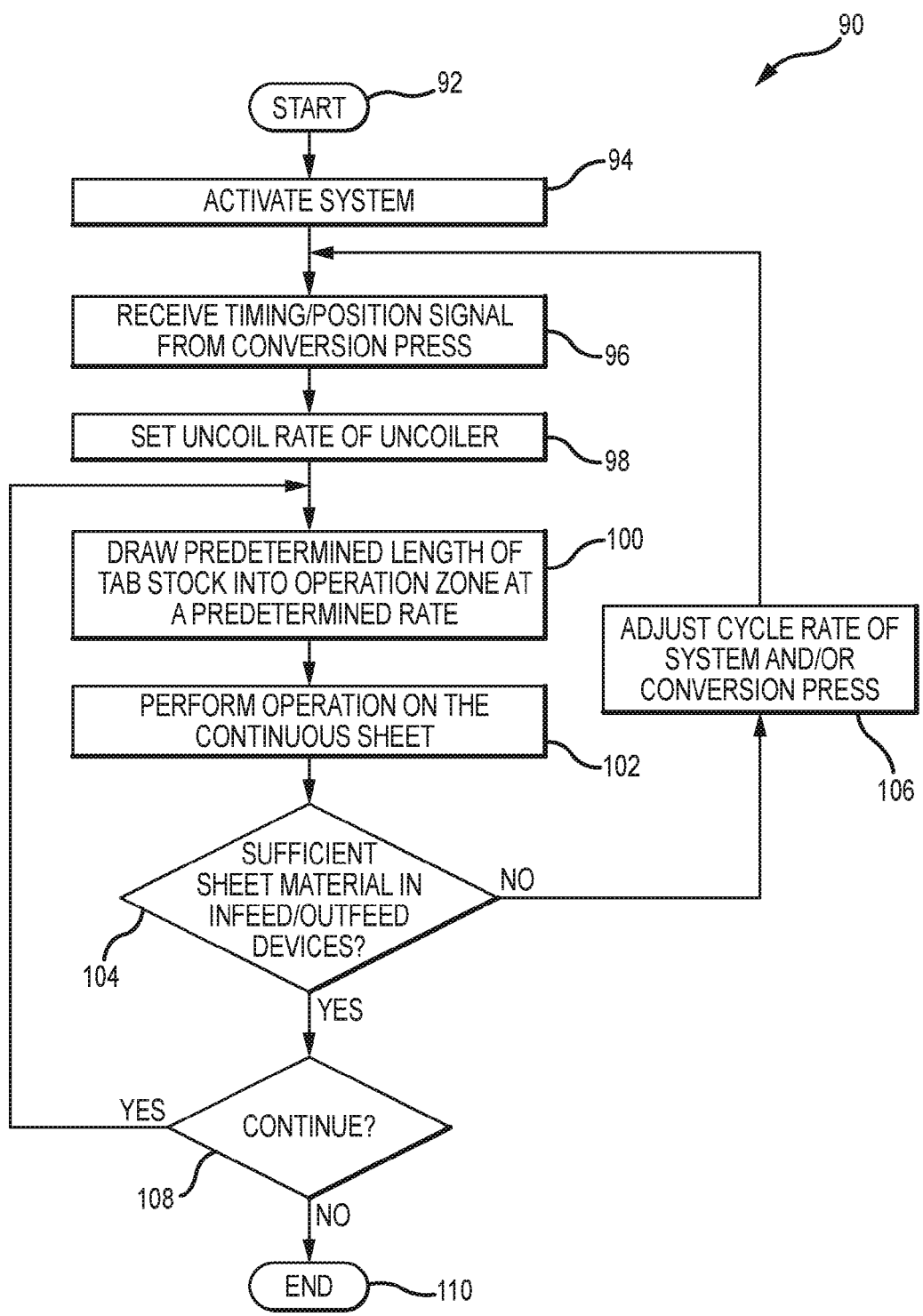
FIG. 6 is a process diagram of a method of performing an operation on a continuous sheet of material according to one embodiment of the present invention.

Referring now to FIG. 6, an embodiment of a method 90 for performing an operation on a continuous sheet 4 of material is generally illustrated. In one embodiment, the continuous sheet is subsequently formed into tabs 60 that will be interconnected to container end closures 74. While a general order of the method 90 is shown in FIG. 6, it will be understood by one of skill in the art that the method 90 can include more or fewer operations and can arrange the order of the operations differently than those shown in FIG. 6. Although the operations of the method may be described sequentially, many of the operations may in fact be performed in parallel or concurrently. Generally, the method 90 starts with a start operation 92 and ends with an end operation 110. The method 90 can be executed as a set of computer-executable instructions executed by a computer system and encoded or stored on a computer readable medium. One example of the computer system may include, for example, the control system 18. An example of the computer readable medium may include, but is not limited to, a memory of the control system 18. Hereinafter, the method 90 shall be explained with reference to the system 2 and components described in conjunction with FIGS. 1-5.

At operation 94, the system 2 is activated. This generally includes, but is not limited to, the control system 18: (1) activating the units 38, 40; (2) activating the dust control system 20; (3) determining that the servo feed unit 32 is ready; (4) determining that a sufficient length of continuous sheet 4 is in each of the infeed and outfeed accumulation devices 28, 44 using information received from the loop sensors 30, 31, 46, 47; (5) determining that the lubricator is ready; and (6) determining that the uncoiler 6 is ready. In one embodiment, activating the units 38, 40 further comprises ensuring lasers of the units 38, 40 are at an operational temperature and/or are properly aligned.

At operation 96, the control system 18 receives information from the encoder 22. The information may include, but is not limited to, the cycle rate of the conversion press 10 and a desired position for the operation that will be performed on the continuous sheet 4. For example, in one embodiment, the information from the encoder 22 may be used by the control system 18 to position a mark formed by a laser in a predetermined position of the continuous sheet. The control system 18 can use the information from the encoder 22 to determine a position for the marks on each portion 36 of the continuous sheet. At operation 98, the control system 18 sends a signal to the uncoiler 6 to control the rate the continuous sheet 4 is uncoiled from the coil 26 of continuous sheet. The control system 18 sends a signal, at operation 100, directing the servo feed unit 32 to move a predetermined length 35 of continuous sheet 4 into the operation zone 50 at a predetermine rate. The predetermined length 35 of continuous sheet 4 may be adjusted by the control system 18 each cycle of the system 2. The control system 18 may also change the input speed of the servo feed unit 32 during each cycle.

The units 38, 40 perform a predetermined operation on the continuous sheet 4 at operation 102. In one embodiment, this comprises lasers of units 38, 40 forming a mark 68 on the continuous sheet. The control system 18 sends signals to the laser units 38, 40 to control the type and position of the marks 68. The length of time available for the laser units 38, 40 to form the marks is also controlled by a signal received from the control system 18. The system 2 is operable to provide unique marks 68 on a plurality of tabs 60. Accordingly, the control system 18 may send a unique design for each mark 68 to the laser units 38, 40 during each cycle of the system 2.

During each cycle of the system 2, the control system 18 substantially continuously monitors the length of continuous sheet 4 in the infeed and outfeed devices 28, 44, as described above, by using information received from sensors 30, 31, 46, 47. The control system 18 can determine, in operation 104, if there is an insufficient length, a sufficient length, or an excessive length of continuous sheet 4 in the infeed and outfeed accumulation devices 28, 44. If the control system 18 determines that the length of continuous sheet 4 is insufficient or excessive in either the infeed or the outfeed device 28 or 44, the method 90 proceeds NO to operation 106. If the control system 18 determines that there is a sufficient length of continuous sheet 4 in devices 22 and 44, the method 90 proceeds YES to operation 108.

In operation 106, the control system 18 can adjust the cycle rate of the system 2 to ensure a sufficient length of continuous sheet 4 in maintained in devices 28, 44. For example, in one embodiment, the control system 18 may increase or decrease the intake rate of the servo feed unit 32. In another embodiment, the control system 18 may send a signal to increase or decrease the time available for the units 38, 40 to perform a predetermined operation. Alternatively, in one embodiment, the control system 18 may send a signal to increase or decrease the power used by the laser units 38, 40. Additionally, the control system 18 can send a signal to the uncoiler 6 to adjust the uncoil rate of the continuous sheet 4. Alternatively, the control system 18 may send a signal to the encoder 22 to adjust the intake rate of continuous sheet 4 by the conversion press 10. After the control system 18 adjusts the cycle rate of the system 2, the method returns to operation 96.

At any time the control system 18 can determine if the system 2 should continue performing an operation on the continuous sheet 4 at operation 108. If the control system 18 determines the operations should continue, method 90 loops YES back to operation 100. The control system 18 can also determine that the operations should stop, for example but not limited to: when marked tabs are not needed by the conversion press 10; when the conversion press 10 has stopped; when the coil 26 of continuous sheet 4 in the uncoiler 6 needs to be replaced; when any component of the system 2 sends an error or alarm code; or when the continuous sheet 4 or the marks made on the continuous sheet by the laser units 38, 40 are misaligned. When marked tabs are not needed by the conversion press 10, the system 2 may be removed from the end closure production system. Alternatively, system 2 may remain integrated with the end closure production system and the continuous sheet 4 can pass freely through the system 2 without marking by the laser units 38, 40. In addition, an operator of the system 2 may send a command to stop the system 2 for any reason using the user interface of the control system 18. If the control system 18 determines the operations should stop, the method 90 proceeds NO to end 110.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. An apparatus for controlling the input and output speed of a continuous sheet of tab stock while providing indicia in a predetermined location, comprising:
   an infeed accumulation device operable to receive the continuous sheet of tab stock;
   an infeed loop sensor to determine an amount of the continuous sheet of tab stock in the infeed accumulation device;
   a marking apparatus operable to form an indicia on a surface of the continuous sheet of tab stock at a marking area;
   a servo feed unit operable to move a predetermined length of the continuous sheet of tab stock into the marking area at a predetermined rate, wherein the servo feed unit is operable to alter the predetermined length of the continuous sheet of tab stock moved into the marking area;
   an outfeed accumulation device operable to receive the continuous sheet of tab stock after the marking apparatus has formed the indicia on the continuous sheet of tab stock; and
   an outfeed loop sensor to determine an amount of the continuous sheet of tab stock in the outfeed accumulation device, wherein the continuous sheet of tab stock is subsequently formed into tabs adapted for interconnection to a container end closure.

2. The apparatus of claim 1, wherein the marking apparatus is a laser unit adapted to form the indicia on the surface of the continuous sheet of tab stock.

3. The apparatus of claim 2, wherein the laser unit comprises a first laser unit to form an indicia on a first surface of the continuous sheet of tab stock and a second laser unit to form an indicia on a second surface of the continuous sheet of tab stock.

4. The apparatus of claim 1, wherein the predetermined rate of the servo feed unit can be altered to adjust the amount of the continuous sheet of tab stock in one or more of the infeed and outfeed accumulation devices.

5. The apparatus of claim 1, wherein the infeed loop sensor measures a distance to a predetermined portion of the continuous sheet of tab stock in the infeed accumulation device.

6. The apparatus of claim 5, wherein the predetermined portion comprises at least one of:
   a lowermost portion of the continuous sheet of tab stock; and
   a transition point between a generally linear portion of the continuous sheet of tab stock and a trough of the continuous sheet of tab stock.

7. The apparatus of claim 1, wherein the infeed loop sensor comprises a first sensor in a first portion of the infeed accumulation device and a second sensor in a second portion of the infeed accumulation device.

8. The apparatus of claim 7, wherein the first sensor is aligned with a position of an insufficient amount of the continuous sheet of tab stock and the second sensor is aligned with a position of an excessive amount of the continuous sheet of tab stock.

9. A first apparatus that performs a first operation on a continuous sheet of material, comprising:
   an apparatus that performs the first operation on at least a portion of the continuous sheet of material in a predetermined period of time;
   a servo unit that moves a predetermined length of the continuous sheet of material into the apparatus at a predetermined rate, wherein the servo unit is operable to alter the predetermined length of the continuous sheet of material moved into the apparatus;
   an outfeed device that accumulates the continuous sheet of material after the first operation is performed; and
   an outfeed sensor that measures a length of the continuous sheet of material in the outfeed device, wherein a rate of the first operation is adjustable to provide a predetermined length of the continuous sheet of material in the outfeed device.

10. The first apparatus of claim 9, further comprising:
    an infeed device that accumulates the continuous sheet of material before the first operation is performed; and
    an infeed sensor that measures a length of the continuous sheet of material in the infeed device, wherein the rate of the first operation is adjustable to accumulate a predetermined length of the continuous sheet of material in the infeed device.

11. The first apparatus of claim 9, wherein a second apparatus that performs a second operation at a second rate receives the continuous sheet of material from the outfeed device.

12. The first apparatus of claim 11, further comprising a control system that adjusts the rate of the first operation in response to a change in the second rate of the second apparatus.

13. The first apparatus of claim 9, wherein the apparatus comprises a laser unit that forms an indicia on a predetermined portion of the continuous sheet of material.

14. The first apparatus of claim 13, wherein the continuous sheet of material comprises aluminum tab stock, wherein the aluminum tab stock is subsequently formed into tabs for end closures by a conversion press that receives the aluminum tab stock from the outfeed device.

15. The first apparatus of claim 9, wherein measuring the length comprises measuring a change in a distance between the outfeed sensor and a predetermined portion of the continuous sheet of material in the outfeed device.

16. The first apparatus of claim 9, wherein the outfeed sensor comprises a first outfeed sensor and a second outfeed sensor, and wherein measuring the length comprises determining that a predetermined portion of the continuous sheet of material is between the first outfeed sensor and the second outfeed sensor.

17. A method of controlling an input rate and an output rate on a continuous sheet of material, comprising:
    accumulating a first length of slack in the continuous sheet of material before a first apparatus performs a first operation;
    moving a predetermined length of the continuous sheet of material into the first apparatus by a servo unit;
    performing the first operation with the first apparatus on the continuous sheet of material, wherein the first apparatus can perform the first operation at a rate that is variable, and wherein the servo unit is operable to alter the predetermined length of the continuous sheet of material moved into the first apparatus;
    accumulating a second length of slack in the continuous sheet of material after the first apparatus performs the first operation;
    monitoring the first length of slack and the second length of slack; and
    adjusting the rate of the first operation performed by the first apparatus to alter at least one of the first length of slack and the second length of slack.

18. The method of claim 17, wherein a laser unit forms a mark on the continuous sheet of material during the first operation.

19. The method of claim 17, wherein a second apparatus that performs a second operation on the continuous sheet of material receives the continuous sheet of material from the second length of slack.

20. The method of claim 19, wherein the second apparatus performs the second operation at a second different rate that is not impaired by the rate of the first operation performed with the first apparatus.

21. The method of claim 19, wherein the second apparatus comprises a conversion press that forms the continuous sheet of material into tabs adapted for interconnection to container end closures.

* * * * *